(12) United States Patent
Hehn et al.

(10) Patent No.: US 9,179,176 B2
(45) Date of Patent: Nov. 3, 2015

(54) METHOD FOR OPERATING A DATA RECEIVER AND DATA RECEIVER, IN PARTICULAR IN A VEHICLE

(75) Inventors: Thorsten Hehn, Wolfsburg (DE); Jens Krause, Braunschweig (DE); Urs Thürmann, Cremlingen (DE); Martin Weiser, Peine (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/343,070

(22) PCT Filed: Jun. 26, 2012

(86) PCT No.: PCT/EP2012/002679
§ 371 (c)(1),
(2), (4) Date: Jun. 6, 2014

(87) PCT Pub. No.: WO2013/034203
PCT Pub. Date: Mar. 14, 2013

(65) Prior Publication Data
US 2014/0298391 A1    Oct. 2, 2014

(30) Foreign Application Priority Data
Sep. 10, 2011    (DE) .......................... 10 2011 113 202

(51) Int. Cl.
*H04N 7/18*      (2006.01)
*H04N 21/433*    (2011.01)
(Continued)

(52) U.S. Cl.
CPC ....... *H04N 21/4334* (2013.01); *H04N 21/2353* (2013.01); *H04N 21/25891* (2013.01);
(Continued)

(58) Field of Classification Search
CPC ............. H04N 21/41422; H04N 7/18; H04N 21/2146; H04N 7/106
USPC .................... 725/75–77, 131–134, 139–142; 709/217–232
See application file for complete search history.

(56) References Cited

U.S. PATENT DOCUMENTS 7,158,167 B1 *  1/2007  Yerazunis et al. ............. 348/61
7,457,511 B2 * 11/2008  Putterman et al. ............ 386/326
(Continued)

FOREIGN PATENT DOCUMENTS

DE         10119067 A1    10/2002
DE     102010008427 A1    12/2010
(Continued)

OTHER PUBLICATIONS

Search Report for German Patent Application No. 10 2011 113 202.7; Apr. 24, 2012.
(Continued)

*Primary Examiner* — Annan Shang
(74) *Attorney, Agent, or Firm* — Barnes & Thornburg LLP (57) ABSTRACT

A method for operating a data receiver for audio and/or video data, wherein a planned and variable program title sequence having program titles is recorded, audio and/or video data relating to at least one program title are received via a data link and are buffered, and audio and/or video data of at least one program title are reproduced. The transmission resources of the data link for audio and/or video data to be transmitted and to be buffered are distributed over at least two program titles that have not yet been reproduced by the data receiver. Also disclosed are a data receiver associated with the method and a media reproduction system connected thereto, in particular in a vehicle.

10 Claims, 4 Drawing Sheets

(51) Int. Cl.
*H04N 21/414* (2011.01)
*H04N 21/442* (2011.01)
*H04N 21/475* (2011.01)
*H04N 21/2668* (2011.01)
*H04N 21/432* (2011.01)
*H04N 21/462* (2011.01)
*H04N 21/61* (2011.01)
*H04N 21/658* (2011.01)
*H04N 21/235* (2011.01)
*H04N 21/258* (2011.01)

(52) U.S. Cl.
CPC ..... *H04N21/2668* (2013.01); *H04N 21/41422* (2013.01); *H04N 21/4325* (2013.01); *H04N 21/4331* (2013.01); *H04N 21/44222* (2013.01); *H04N 21/4622* (2013.01); *H04N 21/4755* (2013.01); *H04N 21/6131* (2013.01); *H04N 21/6582* (2013.01)

(56) References Cited

U.S. PATENT DOCUMENTS 7,561,495 B2* 7/2009 Schade-Buensow et al. ..... 369/7
7,797,064 B2 9/2010 Loomis et al.
8,214,864 B2* 7/2012 Emoto et al. ..................... 725/75
8,391,773 B2* 3/2013 Arseneau et al. ............ 455/3.06
8,578,428 B2* 11/2013 Mitchell ........................ 725/76
9,041,803 B2* 5/2015 Chen et al. .................... 348/143
2004/0042103 A1* 3/2004 Mayer ............................... 360/7
2005/0216951 A1 9/2005 MacInnis
2007/0263066 A1 11/2007 Henning et al.
2011/0035031 A1 2/2011 Faenger et al.

FOREIGN PATENT DOCUMENTS

DE 102010036666 A1 2/2011
EP 1107601 A2 6/2001
KR 1020090008241 1/2009
KR 1020147009207 4/2014

OTHER PUBLICATIONS

Search Report for International Patent Application No. PCT/EP2012/002679; Sep. 19, 2012.

* cited by examiner

| A | 60% |
| B | 30% |
| C | 10% |
| D | |
| E | |
| F | |
| ⋮ | |
| X | |
| Y | |

FIG. 5A

| A | 60% |
| B | 60% |
| C | 30% |
| D | 10% |
| E | |
| F | |
| ⋮ | |
| X | |
| Y | |

| A | |
| B | 60% |
| C | 30% |
| D | 10% |
| E | |
| F | |
| ⋮ | |
| X | |
| Y | |

FIG. 5B

| A | |
| B | 50% |
| C | 50% |
| D | |
| E | |
| F | |
| ⋮ | |
| X | |
| Y | |

FIG. 5C

| A | |
| B | 50% |
| C | 10% |
| D | 40% |
| E | |
| F | |
| ⋮ | |
| X | |
| Y | |

FIG. 5D

| B | 80% |
| F | 10% |
| G | 10% |
| H | |
| I | |
| J | |
| ⋮ | |
| X | |
| Y | |

FIG. 5E

| X | |
| C | 60% |
| D | 40% |
| E | |
| F | |
| G | |
| ⋮ | |
| Y | |
| X | |

FIG. 5F

METHOD FOR OPERATING A DATA RECEIVER AND DATA RECEIVER, IN PARTICULAR IN A VEHICLE

PRIORITY CLAIM

This patent application is a U.S. National Phase of International Patent Application No. PCT/EP2012/002679, filed 26 Jun. 2012, which claims priority to German Patent Application No. 10 2011 113 202.7, filed 10 Sep. 2011, the disclosures of which are incorporated herein by reference in their entirety.

SUMMARY

Illustrative embodiments relate to a method for operating a data receiver for audio and/or video data in which a planned sequence of program titles having a number of program titles is recorded, audio and/or video data for at least one program title are received and buffered via a data link, and audio and/or video data of at least one program title are reproduced. Illustrative embodiments also relate to an associated data receiver and to a media reproduction system connected thereto, in particular in a vehicle.

Illustrative embodiments are suitable for personalized radio and television services in which a personalized program is to be reproduced for a user. In this context, the program can be composed of arbitrary program contributions, e.g. of a mixture of musical items, radio plays, commentaries and news. In this context, each program contribution comprises audio and/or video data which are to be received by the data receiver via a data interface. Each program contribution is also associated with a program title and a data source which refers to the storage location of the associated audio and/or video data.

Disclosed embodiments provide a method for operating a data receiver for audio and/or video data of the type initially mentioned, and an associated data receiver, which improve the availability of a personalized audio and/or video program in a resource-saving manner

BRIEF DESCRIPTION OF THE DRAWINGS

Disclosed embodiments will be explained in greater detail, referring to the figures, in which.

DETAILED DESCRIPTION OF THE DISCLOSED EMBODIMENTS

The method provides for the transmission resources of the data link for audio and/or video data to be transmitted and buffered are distributed by the data receiver to at least two program titles not yet reproduced. This enables different preloading strategies to be implemented situation-dependently. Thus, the transmitting and buffering of not only the subsequent program title but of further program titles can be meaningful or even necessary if, in the case of sudden changes of the planned program, the transmission resources are restricted for a short time. If then only the subsequent program title had been preloaded partially, that is then deleted or pushed toward the back in the sequence of program titles, the strategy of buffering would fail.

In the case of personalized services, a user interaction must always be expected by the system, i.e. that the user will intervene actively in the planned sequence of program titles in the actual case or there are at least indications that he will possibly do this. This is independently of whether such references to a user reaction are recordable or are actually recorded. In a disclosed embodiment of the method, references to a user behavior with respect to a reproduced program title are recorded. The relative proportion of the transmission resources of the data link for audio and/or video data to be transmitted and buffered of at least two program titles not yet reproduced is then changed based on at least one recorded reference to a user behavior. This makes it possible to estimate the acceptance of the planned program from the user behavior and thus to support a predictive and efficient allocation of the available transmission resources for the audio and/or video data to be buffered and to be reproduced of the program title from the proposed sequence of program titles.

In the narrower sense, the program title only establishes a link to the associated audio and/or video data without however comprising these. In the text which follows, therefore, the term "program contribution" which comprises both the program title and associated data source and the associated audio and/or video data will also be used in addition to the term "program title" in the text which follows. In the text which follows, the reproduction of a program title or program contribution is understood to be a reproduction of the associated audio and/or video data, wherein the program title itself and the data source can be indicated optionally but do not need to be. It can be inserted, e.g., in a footer of a reproduced video.

The data link for the transmission of the audio and/or video data has, in particular, a time-variable transmission rate dependent on type, which cannot be controlled by the data receiver. This is, for example, a mobile radio link.

For purposes of the disclosed embodiments, references relating to a user behavior with respect to a reproduced program title comprise all recordable, directly or indirectly measurable reactions of the user during the reproduction of a program contribution. They comprise actions of the user such as, e.g., talking or producing gestures. In at least one disclosed embodiment, the mimicry of the user can be recorded, e.g., by a camera to derive from this an emotion of the user.

Depending on the embodiment of the method, references to a user behavior are recorded from the interaction of the user with the data receiver and/or the reproduction device. For example, the user changes the reproduced volume or inputs an input signal for skipping the program contribution currently being reproduced. From the reproduced volume and the length of stay with a program contribution, conclusions are therefore drawn with respect to the agreement or the disagreement by the user with the program contribution currently being reproduced.

When the disclosed method is used in a vehicle, it is also possible to obtain information relating to the driving style of the driver, e.g. whether the driver changes the speed of the vehicle. In particular, the change of the driving style allows conclusions with respect to the acceptance of the contribution in the case of a constant driving situation.

In this context, individual references to a user behavior do not actually need to be causally related to the current program contribution. For example, they can also fall randomly into the period of the reproduction of a program contribution. According to an illustrative embodiment, a plurality of distinguishable references to a user behavior, the probability is determined with which a particular acceptance category is allocated to the reproduced program title on the recording of a reference to a particular user behavior and that, based on a plurality of probabilities thus determined, an acceptance profile is allocated to the reproduced program title. The relative proportion of transmission resources of the data link for audio and/or video data to be transmitted and buffered of at least two program titles not yet reproduced is then changed based on the acceptance profile of the program title reproduced. By this means, it is possible to consider and evaluate the references as independent parameters. This provides for a robust algorithm for determining the probabilities that, after evaluation of possibly a large number of references to a user behavior, a particular program title is allocated to an acceptance category.

In another disclosed embodiment of the method, the distribution and/or change of the relative proportion of the transmission resources for audio and/or video data to be transmitted and buffered of at least two program titles not yet reproduced depends on the position of a program title in the sequence of program titles and/or the remaining volume of data of a program title still to be transmitted. Therefore, the predictive control of the transmission resources can be improved further in the case of a program change. For example, relatively large audio and/or video files can thus be transmitted with higher priority if they are to be reproduced earlier than expected in the case of the omission of one or more program titles preceding them in the sequence of program titles, but because of transmission resources restricted at short notice, a punctual ad-hoc transmission without partial prebuffering could no longer be guaranteed.

In particular, it may be provided that a plurality of program titles not yet reproduced in the sequence of program titles are alternative program titles which are to be reproduced alternatively with respect to one another after the program title reproduced has ended. These program titles compete with one another, only one of them being selected and the others being discarded. The advantage is that very different program titles can be included experimentally in the sequence of program titles and the general line of the program can be maintained or also changed abruptly depending on agreement or rejection by the user. Thus, groups of a plurality of program titles can always be provided, at least one of which is similar to the program title currently being reproduced and at least one of which exhibits significant differences from it. Such a program title differs, e.g., in at least one attribute, e.g. in the interpreter or in the style orientation of the music title.

In another disclosed embodiment of the method, the weighting of the factors, based on which the relative proportions of the transmission resources of audio and/or video data to be transmitted and buffered are changed, is changed during the operation of the data receiver. For the resource allocation, for example, an ever-lower significance is attributed to certain references to a user behavior in the course of the process or the volume of data still to be transmitted and the acceptance of a program title, derived from the acceptance category, is newly weighted.

In the cases hitherto mentioned, the available transmission resources for subsequent program titles are changed as a precaution in the case that there is a change in the sequence of program titles. If this then actually takes place, the planned sequence of program titles can be changed based on a reference to a user behavior.

According to another disclosed embodiment of the method, based on changes in the sequence of program titles, the available transmission resources, their variability and/or the volume of data to be transmitted of a program title following the reproduced program title, a data format is set which determines the transmission rate of the following program titles. In particular, the data format comprises the source coding method, also called codec, with which the data to be transmitted were compressed. In this context, the data rate which is needed for reproducing in real time can be different depending on codec. Specifying a new data format thus has the advantage that the data transmission of the audio and/or video data can be adapted to the transmission conditions. Thus, a codec having a lower requirement for data rate can transmit the data to be transmitted more rapidly, possibly with slight losses in quality, in the case of lower transmission rates or when an interruption of the transmission threatens. On the other hand, a codec which provides an improved image and/or sound quality can be selected for the transmission if an adequate data rate is available.

In another disclosed embodiment of the method, the sequence of program titles comprises locally stored program titles not transmitted via the data interface. For example, a program based on locally stored program contributions can be suggested to the user which, however, can be extended by individual program titles which can be received via the data link. This enables a diversified program which corresponds to the taste of the user to be provided even in the case of a not very reliable or situational expensive data link. The user receives the program, for example, in a vehicle during an overland trip with poor mobile radio coverage from his mobile radio provider and good coverage from a different network operator which, however, would result in expensive roaming fees. In particular, in such a case a locally stored program title can be optionally inserted at the front position of the sequence of program titles if no program title transmitted via the data link can be replayed due to insufficient transmission resources.

Furthermore, the locally stored program titles in the sequence of program titles can be optionally selected based on a previously defined selection algorithm, based on program titles to be transmitted in the sequence of program titles and/or based on the previously recorded history of the references to a user behavior. For example, a generic recommendation program has been received by the service provider which uses the program contributions reproduced hitherto, the program contribution provided as the next one and the user reactions until now to the program contributions reproduced as input parameters for generating a replacement program title as output parameters, if the program contribution intended to be the next one is not transmitted successfully or the transmission threatens to fail. Such a replacement program title can be calculated and updated continuously in the background via a defined algorithm, independently of whether it is actually intended to be reproduced as replacement or not.

The disclosed data receiver comprises means for recording a planned and changeable sequence of program titles having a number of program titles, a data interface for receiving audio and/or video data and a memory unit for buffering audio and/or video data for at least one program title, received via the data interface. The data receiver also comprises an interface to a media reproduction system for audio and/or video data of at least one program title and a control unit which is connected to the means for recording a planned and changeable sequence of program titles, the data interface, the memory unit and the interface to the reproduction device. By means of the control unit, the transmission resources of the data interface can be distributed by the data receiver to audio and/or video data to be transmitted and buffered of at least two program titles not yet reproduced. In particular, the data receiver is suitable for performing the disclosed method. Thus it also has the advantages of the disclosed method.

The data receiver advantageously comprises a recording device for recording references to a user behavior with respect to a program title reproduced, with the aid of which the user acceptance of the currently reproduced program title can be estimated even better.

According to disclosed embodiments, a media reproduction system for audio and/or video data for a vehicle is connected to such a data receiver. In particular, the media reproduction system is a vehicle infotainment system via which permanently stored program contributions and/or program contributions from detachably connected data media can be reproduced. E.g., audio and/or video data can be reproduced from CD (compact disc), DVD (digital versatile disc) or memory sticks (e.g. data media for audio data). These locally available program contributions are ideally already previously classified in such a manner that they can be compared with other program contributions, especially with the planned program contributions. In at least one disclosed embodiment, the classification of the locally available program contributions is also possible.

According to disclosed embodiments, a vehicle is furthermore equipped with such a data receiver and/or media reproduction system.

In the text which follows, the data receiver according and the method are explained by means of illustrative embodiments in conjunction with a media reproduction system in a vehicle. However, it is pointed out that the data receiver and the method are also suitable for other fields of use. For example, they can also be used for stationary or portable devices by means of which personalized programs can be received via a data link fluctuating in the transmission rate, in particular a mobile radio link.

Figure 1:
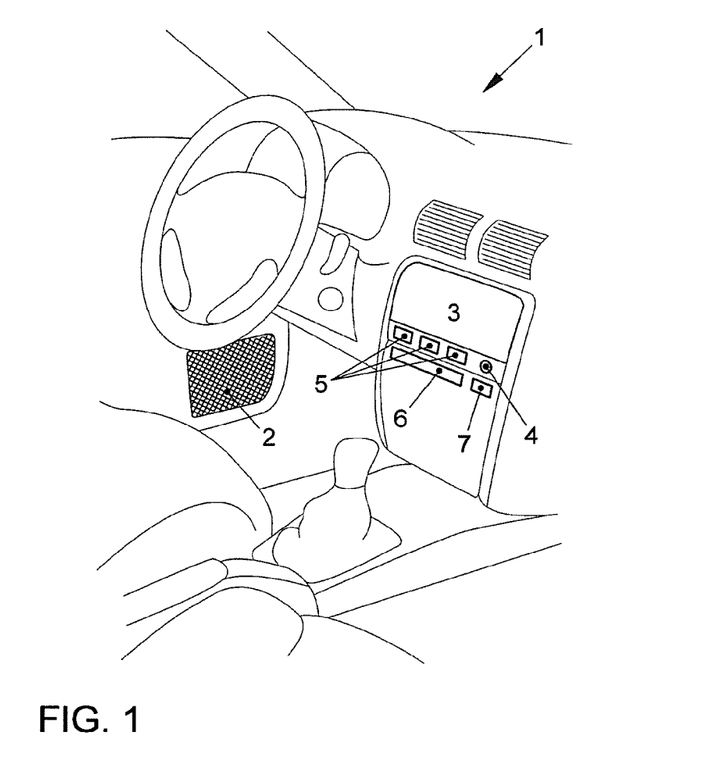
FIG. 1 shows the view of a cockpit of a vehicle which is equipped with a media reproduction system according to an illustrative embodiment.

FIG. 1 shows a cockpit of a vehicle 1 which is equipped with a media reproduction system according to an illustrative embodiment. The media reproduction system comprises input and output means for operating the media reproduction device and for the reproduction of media. In particular, it comprises one or more loudspeakers 2 for outputting acoustic media, in particular personalized radio programs. The loudspeakers 2 are arranged, for example, in a manner known per se in the doors, in parts of the cockpit or at other suitable locations in the vehicle 1. The media reproduction system also comprises a display 3, a volume control 4, further operating keys 5, a CD player 6 and an MP3 player 7 (MP3— moving picture expert group audio layer 3) which are arranged in a module in the upper area of the center console so that they can be easily viewed and operated by a driver and passenger. Via the CD player 6 and the MP3 player 7, music titles or other audio program contributions can be replayed by locally available audio data media in the vehicle 1. On the display 3, it is possible to reproduce not only video data but also, for example, information relating to a currently reproduced program title.

Figure 2:
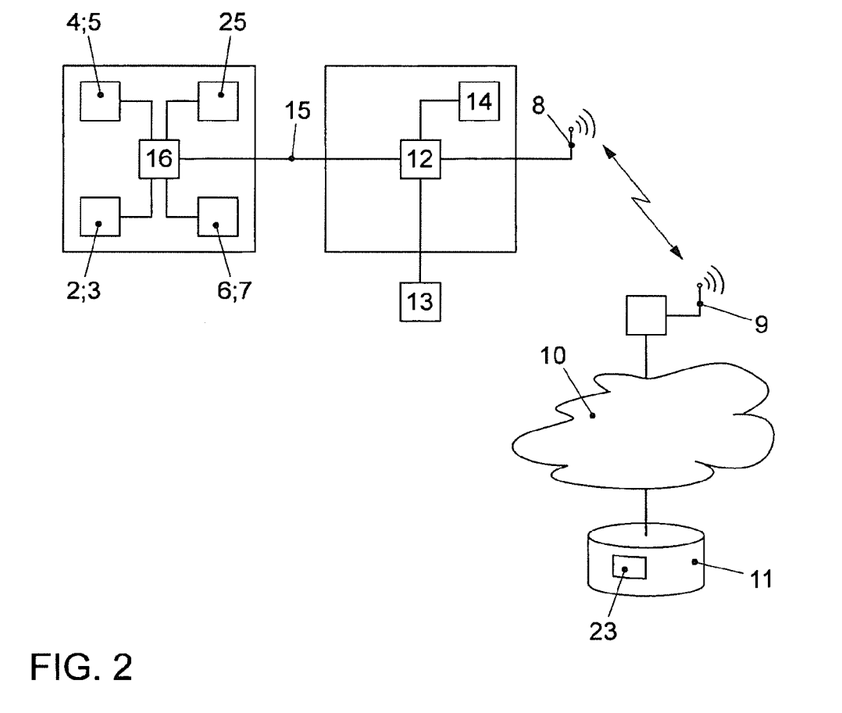
FIG. 2 diagrammatically shows the structure of a media reproduction system comprising a data receiver connected by radio to a service provider according to one illustrative embodiment.

FIG. 2 diagrammatically shows the structure of a media reproduction system comprising a data receiver according to an illustrative embodiment. In this context, the media reproduction system also comprises a processor 16 which is connected to the input and output means 2-5 and to the CD player 6 and the MP3 player 7 and controls these. Furthermore, the media reproduction system can receive audio and/or video data from the data receiver via the interface 15 for reproduction via the loudspeakers 2 and/or the display 3.

In the media reproduction system, an option generator 25 is also installed as an executable program which can recommend music titles or other audio program contributions stored locally in the media reproduction system according to a defined algorithm based on input parameters.

The data receiver comprises a user acquisition system 13 or is connected to such a one. With the aid of the user acquisition system 13, references to a user behavior with respect to a program title reproduced can be recorded as will be explained below in greater detail in conjunction with the disclosed method. The user acquisition system comprises, e.g., a camera system for recording the user mimicry to derive from this conclusions about the user attitude and thus about the possible agreement for or rejection of the program title currently being reproduced.

The data receiver also comprises a mobile radio module 8 with the aid of which a mobile radio link to a mobile radio network 9 can be set up. Among other things, audio and/or video data can be received via the mobile radio interface 8, 9 which can be buffered in a buffer memory 14. The buffer memory 14, the user acquisition system 13, the interface 15 to the media reproduction system and the mobile radio module 8 are connected to a control unit 12 of the data receiver.

The data receiver is connected by radio to a service provider 11 which is connected to the mobile radio network 9 via the Internet 10. The service provider 11 provides personalized radio programs which, in particular, comprise music titles, commentaries and news. The individual program contributions can then be described by attributes so that two program contributions can be compared with one another with respect to their similarity. In this manner, the acceptance of a program title can be used to infer the acceptance of another program title with a certain probability.

By procedure known per se, the user of the media reproduction system, e.g. the driver of the vehicle 1, can register with the service provider 11 and request a personalized program. The service provider 11 will then propose a sequence of program titles 23 which will be received via the mobile radio module 8 of the data receiver.

The method will now be explained in greater detail with reference to FIGS. 3 to 5F. To perform the method, in particular, the media reproduction system comprising the data receiver which is connected via a radio link 8, 9 to a service provider 11 can be used as has been described with reference to FIG. 2.

In the text which follows, it is assumed that the data link for receiving the audio data as such from the data receiver, cannot be influenced directly. After the link has been set up, the transmission rate, in particular, is determined by the mobile radio network 9. This is, for example, a data link via a UMTS (Universal Mobile Telecommunication System) network with HSDPA (High Speed Downlink Packet Access) transmission method in which an individual data transmission rate is assigned to each subscriber by the network based on a series of link parameters of links to all subscribers located in a mobile radio cell. In this context, a number of mechanisms are active which have to be balanced against each other continuously. Depending on which data service the subscriber has requested, how good the link of the individual subscribers to the base station is and how many subscribers are located in the respective radio cell, the data transmission rate is assigned in such a manner that the data throughput is as great as possible in the cell, but with the boundary condition that no subscriber is preferred or disadvantaged too greatly (e.g. according to the so-called "channel dependent scheduling" or "fair scheduling"). For example, real-time services, e.g. voice, is treated with higher priority than data services. Furthermore, the overall throughput can vary greatly due to the continuously changing subscriber constellation in the mobile radio cell. The data transmission rate which is assigned to a particular subscriber can drop rapidly in the worst cases. In the case of a handover into another radio cell or if the mobile radio module 8 enters into an area of shading, the data link can even be interrupted completely for minutes.

On reception of the sequence of program titles 23, the control unit 12 of the data receiver causes the audio data belonging to the first program title to be downloaded. In this context, the audio data can be located on a server of the service provider 11. The audio data can also be stored, e.g. at a different location in the Internet 10, the service provider 11 additionally conveying the source information, e.g. a corresponding Internet link, when transmitting the sequence of program titles 23.

As an alternative, the sequence of program titles 23 can also be generated differently. For example, it is generated locally by a user in the vehicle 1 for all vehicle passengers by being input into the media reproduction system via the operating keys 5 and conveyed to the data receiver via the interface 15. The audio data for the sequence of program titles input can then be received via the mobile radio interface 8, 9 by being downloaded from a server, e.g. that of the service provider 11.

On the one hand, the audio data have to be buffered at least partially due to the fluctuating transmission resources to be able to guarantee continuous service. On the other hand, downloading in the strict order according to the received sequence of program titles 23 would be risky because the user acceptance of the proposed program is not sure and the user expects from the personalized program that he is allowed to intervene in a controlling manner. For this reason, fallback solutions must be kept available for the case that the sequence of program titles is changed and/or the available transmission rate is suddenly reduced.

Figure 3:
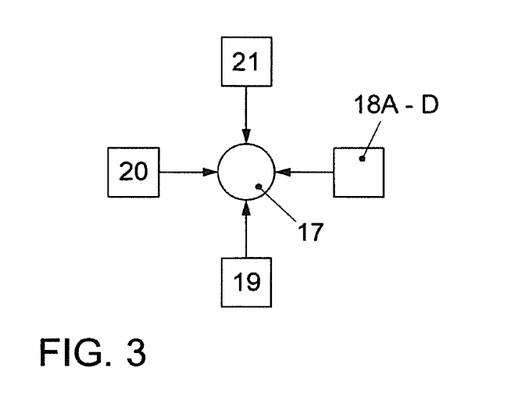
FIG. 3 shows a resource allocator of the data receiver according to an illustrative embodiment.

In FIG. 3, a resource allocator 17 is shown, the algorithm of which is stored in the control unit 12 of the data receiver. The resource allocator 17 distributes the available transmission resources automatically to a plurality of audio data, still to be transmitted and buffered, of the program titles without an intervention of the service provider 11 being required during the resource allocation. The resource allocation occurs locally in the control unit 12 by means of the TCP (Transmission Control Protocol) which controls the transmission via the Internet protocol (IP) in such a manner that the transmission rate is distributed to individual program titles locally in the data receiver.

The resource allocator 17 is connected to an acceptance checker 18A-18D, an urgency checker 19, an interaction checker 20 and a data volume checker 21. These checking entities calculate for each program title in the list of program titles 23 allocation rates which determine the relative proportion of available transmission resources.

The acceptance checker 18A-18D checks the acceptance of the currently reproduced program title. In this context, it is possible to distinguish references to different user reactions and correlate these with other system observations at a later time, e.g. whether the user has changed the reproduction of the program title shortly thereafter.

The acceptance checker 18A receives data from the user acquisition system 13 and evaluates these. The acceptance checker 18B evaluates control data of the volume control 4. The acceptance checker 18C evaluates further control data about the reproduction of the current program title by recording, e.g., whether the reproduction of the current program title has been interrupted or for how long it been has been reproduced in an uninterrupted manner. Finally, the acceptance checker 18D evaluates the vehicle data by recording and evaluating, e.g., the traveling speed of the vehicle 1 or conclusions relating to the driving style.

Figure 4:
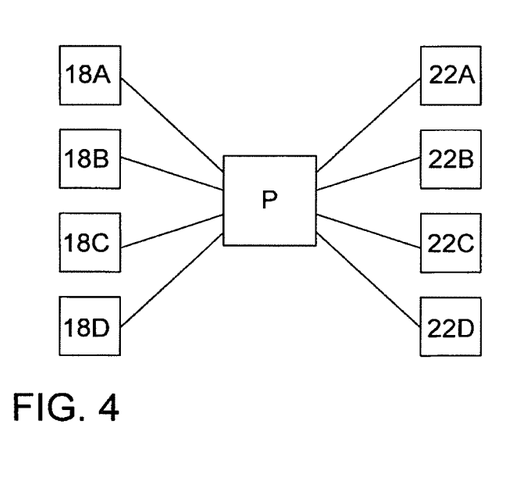
FIG. 4 diagrammatically shows an allocation of references to a user behavior to certain acceptance categories according to an illustrative embodiment.

The references to various user behaviors which have been recorded by the individual acceptance checkers 18A-18D are in each case allocated to the individual acceptance categories 22A-22D as is shown diagrammatically in FIG. 4.

Acceptance category 22A corresponds to the highest agreement by the user. For this category, it is assumed that the agreement of the user is so high that he would like to hear further such program titles. Depending on which probability has been determined for this category, the sequence of program titles 23 can be changed to the effect that similar program titles are preferred in the order of reproduction.

Acceptance category 22B corresponds to a moderate agreement by the user. For this category, it is assumed that the sequence of program titles 23 does not require any modification.

Acceptance category 22C corresponds to a slight, at least temporary rejection by the user. For this category, it is assumed that the current program title should not be played to the end as planned and/or that similar subsequent program titles should be deferred at least slightly in time. The user finds himself, for example, in a mood which does not correspond to the current program title. The subsequent sequence of program titles 23 may then be changed correspondingly.

Acceptance category 22D corresponds to a general rejection by the user. For this category, it is assumed that correspondingly similar program titles should be banned completely from the program. The corresponding program title is allocated, for example, to a music group or style orientation which meets general rejection by the user. The subsequent sequence of program titles 23 may be changed correspondingly.

The probability is then determined with which a program title currently being reproduced is to be allocated to a particular acceptance category on recording of a reference to a particular user behavior. In this context, a program title can be initially allocated to the acceptance category 22B with a probability of 100% until something deviating from this is determined by the acceptance checkers 18A-18D. For example, the probability of acceptance categories 22A is increased by good-mood mimicry recorded by acceptance checker 18A or the probability of acceptance category 22C, 22D is increased by a reduction in the reproduced volume recorded by acceptance checker 18B. However, a program title newly to be reproduced can have an acceptance profile in which a certain probability has been estimated for each of acceptance categories 22A-22D already before its reproduction, especially due to comparisons of similarity with other program titles.

According to at least one disclosed embodiment of the method, a resultant elementary probability of association with a particular acceptance category 22A-22D can be determined for each distinguishable reference to a user behavior. This independent approach by way of elementary probabilities enables individual observed references to a user behavior to be correlated. If a number of different references to a user behavior are then recorded for a program title, the overall probability that the program title can be allocated to an acceptance category is then determined on the basis of the elementary probabilities. For two elementary probabilities that when two references Y1, Y2 are recorded, the program title should then be allocated to a particular acceptance category AK, it is then calculated as follows:

$$P(AK|Y1, Y2)=(P(AK|Y1)*P(AK|Y2))/(P(AK|Y1)*P(AK|Y2)+(1-P(AK|Y1))*(1-P(AK|Y2))),$$

where P(AK, Y) is the conditional probability for the allocation to acceptance category AK, the prerequisite being that a reference Y has been recorded.

The elementary probabilities may also be stored in a so-called look-up table by which the probabilities of association of the relevant program title with an acceptance category can be determined.

The urgency checker 19 determines how urgently the audio data of a program title have to be downloaded and buffered. Transmitting and buffering the audio data of the program title following the program title currently being reproduced is thus more urgent than transmitting and buffering the audio data of program titles to be reproduced later.

If the sequence of program titles 23 comprises a group of program titles to be reproduced alternatively, the urgency checker 19 also takes into consideration, in particular, which hypothetic proportion of the reproduced program title would favor, upon ending, which of the program titles following alternatively. For example, in the case of a regular ending of the reproduced program title, it is assumed that the program title placed next is to be reproduced but if it ends prematurely, in contrast, it is assumed that an alternative program title positioned farther back in the sequence of program titles 23 is to be reproduced. With this strategy, the urgency checker 19, at the beginning of the reproduction of a program title, can initially prioritize the alternative program title more highly so that in the case that the program title currently being reproduced were to be really terminated, a sufficient proportion of the alternative program title has been transmitted and buffered. In this case, a large proportion of the reproduction time of the current program title still remains for transmitting and buffering the program title placed next which, of course, should only be reproduced if the current program title ends regularly, so that the urgency for the program title placed next is progressively increased only in the course of the further reproduction.

The interaction checker 20 checks whether or to what extent the user makes use of his option to influence the sequence of program titles 23. In particular, it is taken into consideration how much data is recorded via the acceptance checkers 18A-18D and whether there have been changes in the planned sequence of program titles in the past.

The data volume checker 21 checks what volume of data of the audio data of a particular program title still has to be transmitted and buffered. This is of importance particularly for program contributions involving relatively large volumes of data which must be preloaded even more foresightfully than relatively small audio files.

The weighting of the allocation rates assigned to each of the individual checking entities 18A-18D, 19-21 is continuously monitored in the course of the operation of the data receiver and changed, if necessary.

In FIGS. 5A-5F, sequences of program titles 23 are shown diagrammatically, to the program titles A-H of which proportional transmission resources 24 have been assigned by the data receiver according to an illustrative embodiment of the method. As initial situation in FIG. 5A, it is assumed that the personalized program has just been requested. After a brief preloading time, the reproduction of the first program title A can begin even if the associated audio data have not yet been transmitted completely. For this reason, 60%, 30% and 10% of the proportional transmission resources 24 are assigned to the program titles A, B, C.

Figure 5A:
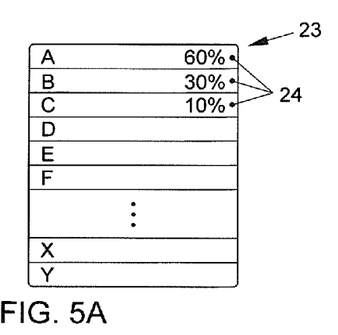
FIGS. 5A-5F diagrammatically show sequences of program titles, the program titles of which are assigned proportional transmission resources by the data receiver according to an illustrative embodiment of the method.
Figure 5B:
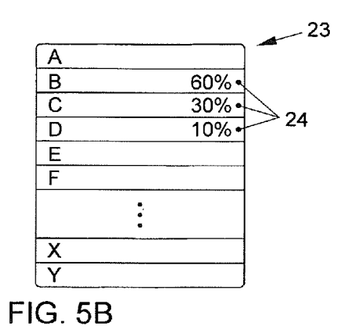

If the audio data of program title A have then been completely buffered, the proportional transmission resources 24 are then newly assigned (in each case 60%, 30% and 10% to program titles B, C, D, see FIG. 5B).

In FIGS. 5C-5F, various situations which may occur during the reproduction of the program are described illustratively.

Figure 5C:
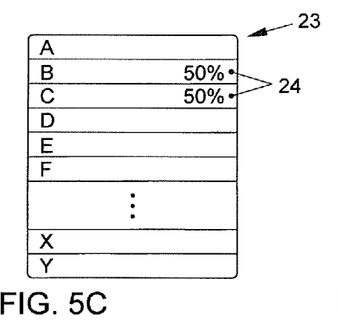

In FIG. 5C, the case is described that a reference to a user behavior is recorded which points to a strong agreement with the program title A. Following this, the acceptance profile of program title A is changed in such a manner that the probability for acceptance category 22A is then increased for it. It is also determined that program title C has great similarities with program title A. The resource allocator 17 of the data receiver increases the proportional transmission resources for program title C because an increased probability is now given that when the reproduction of program title A is ended, the sequence of program titles 23 will have been changed. The proportional transmission resources 24 are set to in each case 50% for the audio data of program titles B and C.

Figure 5D:
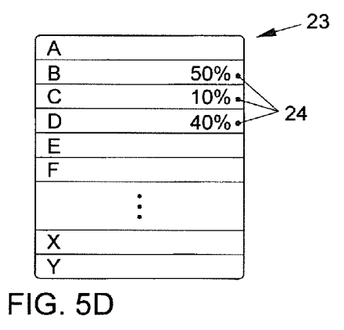

In FIG. 5D, the case is shown that the audio data belonging to program title D are distinctly more voluminous than those of the remaining program titles B, C, E, F. The data volume checker 21, therefore, increases the proportional transmission resources 24 for program title D whilst the urgency checker 19 demands a continuing high transmission rate for program title B which is to be reproduced next.

Figure 5E:
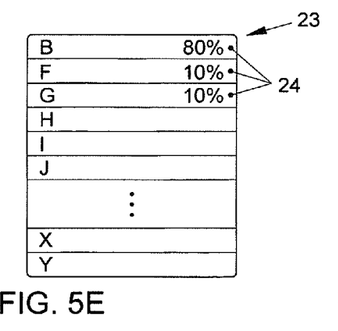

In FIG. 5E, the case is shown that the user has prematurely ended program title A. For example, he has created a jump to the next program title to be reproduced by operating one of the operating keys 5. This is interpreted as reference to a user behavior which downgrades program title A into acceptance category 22D. Because of the similarity with program titles C, D, E, these are now also downgraded and correspondingly removed from the sequence of program titles 23. Program title B is selected as following program title from the group of possible following program titles B, C, D, E.

Because audio data still have to be transmitted and buffered for program title B now placed first, the urgency checker 19 is requested to correspondingly increase the proportional transmission resources. The allocation of the proportional transmission resources 24 to the first three program titles B, F, G is now set, for example, to 80%, 10%, 10%.

Figure 5F:
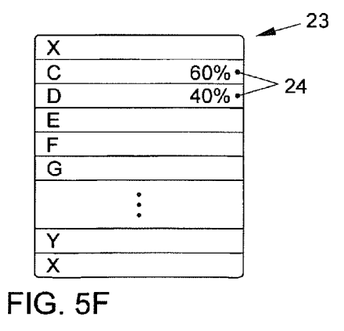

For the case shown in FIG. 5F that either too many proposed program titles have been rejected by the user and/or that no transmission resources are available for a period from the network, the program title C placed first, proposed by the service provider 11, can no longer be reproduced without a program interruption becoming probable. For example, so few audio data have been buffered for program title C that only a brief period, e.g. 10 seconds, can be bridged. In this case, the sequence of program titles is supplemented by a locally stored program title X at the first position. In this way, a guaranteed uninterrupted and personalized program can still be offered to the user. As a precaution, a different coding process can be used for the transmission of the subsequent program titles. The subsequent program titles C-G are requested from the service provider 11, e.g. in a source coding method which needs a lower data rate. The source coding method is changed in such a manner that the data rate needed for real-time loading is lowered from, e.g. 128 kbit/s to 64 kbit/s.

In the case where the network availability is continuously poor and transmission resources are available only sporadically, a personalized program can also be offered with which the control unit of the data receiver receives a list of program titles stored locally in the media reproduction device, generated in accordance with the previously defined algorithm by the option generator 25, which titles are supplemented by individual program titles proposed by the service provider (not shown).

Personalized radio data enjoy increasing popularity. A user can here specify the program to be reproduced, e.g. via an Internet link, by specifying, for example, desired titles, interpreters and orientations of music. He can also produce general entries by selecting, e.g., a predefined profile or specifying a mood, in dependence on which an associated sequence of program titles is then generated. The audio data of the corresponding titles are then conveyed in real time individually via the Internet link to the data receiver on which they are played to the user via a reproduction system. In this context, the program is proposed typically by a service provider via which the audio and/or video data are also provided. As an alternative, however, the proposed program can also be generated differently in that a sequence of program titles is input, e.g., locally by a person at the data receiver and, on the basis of this, a program is reproduced for this and/or other persons.

The user has then the possibility of intervening in the replay process in a controlling manner to varying degrees by informing the service provider of his agreement or his dislike. These messages are evaluated and can effect an early termination of the title currently being reproduced and have effects for the subsequent program. To this end, similarities between possible titles to be reproduced are determined so that titles can be compared with one another and can be allocated to certain categories in accordance with their similarities. In the further course of the program, certain categories can thus be banned from the program, for example.

Known reproduction systems for personalized radio programs and other services download the title currently to be reproduced via the data link and begin with the reproduction as soon as a certain proportion of the audio and/or video data belonging to the title have been received by the data receiver.

In the case of a disturbed transmission via the data interface, the audio and/or video data must be transmitted with foresight to the data receiver to avoid gaps in the transmission and thus prevent temporary program failures from occurring. Such a situation occurs particularly in the case of a data transmission via a mobile radio interface, but can also occur with wire-connected data interfaces, e.g. in the case of overloading of the transmission capacities or of a server. In this context, it must also be taken into consideration additionally for personalized programs that the program to be replayed can be changed abruptly because of user interactions which cannot be exactly predicted.

US 2011/0035031 A1 describes a personalized entertainment system in which a preference profile of a user is determined and the entertainment contributions are selected based on the preference profile. To determine the preference profile of the user, stored media files and user responses to the program running are analyzed. In the case of changing availability of receivable radio transmitters during the travel in a vehicle, a reference to the transmitting frequency of adjacent radio transmitters of a similar style orientation can be sought and set automatically.

In DE 101 19 067 A1, a method relating to the personalized replaying of multimedia files with an entertainment device is described. In this context, multimedia files can be received by mobile radio or broadcast, stored by means of a user profile and reproduced time-independently.

In DE 10 2010 008 427 A1, a method relating to the delayed replaying of audio files in a vehicle is described in which files to be replayed are loaded in a foresighted manner and buffered at the receiver. During a restart of the vehicle, the buffered data can then be replayed even if the link to the data source has been disturbed or briefly interrupted due to the restart.

However, the methods mentioned above have the disadvantage that the transmission of audio and/or video data for a personalized program may require buffering of a relatively large amount of audio and/or video data in the case of a disturbed data link. This then makes higher system demands on the data receiver in which the audio and/or video data have to be stored. Furthermore, the approach of buffering relatively large amounts of audio and/or video data in advance can lead to unsatisfactory program proposals because the currency of the program contributions cannot be considered sufficiently well.

LIST OF REFERENCE SYMBOLS 1 vehicle
2 loudspeaker
3 display
4 volume control
5 operating keys
6 CD player
7 MP3 player
8 mobile radio module
9 mobile radio network
10 Internet
11 service provider
12 control unit of the data receiver
13 user acquisition system
14 buffer memory of the data receiver
15 interface
16 processor media reproduction system
17 resource allocator
18A-D acceptance checker by reference to a user behavior
19 urgency checker
20 interaction checker
21 data volume checker
22 acceptance category
23 sequence of program titles
24 proportional transmission resources
25 option generator
A-H, Z-Z program titles

The invention claimed is:

1. A method for operating a data receiver for audio and/or video data, the method comprising:
    recording a planned and variable sequence of program titles having a number of program titles;
    receiving and buffering audio and/or video data for at least one program title via transmission resources of a data link;
    reproducing audio and/or video data of the at least one program, and
    distributing, by the data receiver, the transmission resources of the data link for audio and/or video data to be transmitted to at least two program titles not yet reproduced,
    wherein the distribution of the transmission resources to at least two program titles not yet reproduced is based at least on an estimate of acceptance of the at least two program titles.

2. The method of claim 1, wherein
    references to a user behavior with respect to a reproduced program title are recorded and the relative proportion of the transmission resources of the data link for audio and/or video data to be transmitted and buffered of at least two program titles not yet reproduced is changed in dependence on at least one recorded reference to a user behavior.

3. The method of claim 2, wherein,
for a plurality of distinguishable references to a user behavior, the probability is determined with which a particular acceptance category is allocated to the reproduced program title on the recording of a reference to a particular user behavior,
based on a plurality of probabilities thus determined, an acceptance profile is allocated to the reproduced program title, and
the relative proportion of the transmission resources of the data link for audio and/or video data to be transmitted and buffered of at least two program titles not yet reproduced is changed based on the acceptance profile of the program title reproduced.

4. The method of claim 1, wherein the distribution or change of the relative proportion of the transmission resources for audio and/or video data to be transmitted and buffered of at least two program titles not yet reproduced depends on the position of a program title in the sequence of program titles and/or the remaining volume of data of a program title still to be transmitted.

5. The method of claim 3, wherein the weighting of the factors based on which the relative proportions of the transmission resources of audio and/or video data to be transmitted and buffered are changed, is changed during the operation of the data receiver.

6. The method of claim 2, wherein the planned sequence of program titles is changed based on a reference to a user behavior.

7. The method of claim 1, wherein, in dependence based on changes in the sequence of program titles, the available transmission resources, their variability and/or the volume of data to be transmitted of a program title following the reproduced program title, a data format is set which determines the transmission rate of the following program titles.

8. The method of claim 1, wherein
the sequence of program titles comprises locally stored program titles not transmitted via the data link,
a locally stored program title being optionally inserted at the front position of the sequence of program titles if no program title transmitted via the data link and is replayed due to insufficient transmission resources and/or
the locally stored program titles in the sequence of program titles being optionally selected based on a previously defined selection algorithm, based on program titles to be transmitted in the sequence of program titles and/or based on the previously recorded history of the references to a user behavior.

9. A data receiver, comprising:
a radio module that records a planned and rearrangeable sequence of program titles having a number of program titles;
a data interface for receiving audio and/or video data;
a memory unit for buffering audio and/or video data for at least one program title, received via the data interface;
an interface to a media reproduction system for audio and/or video data of at least one program title; and
a control unit which is connected to the radio module for recording a planned and changeable sequence of program titles, the data interface, the memory unit and the interface to the reproduction device,
wherein by the control unit, the transmission resources of the data interface can be distributed by the data receiver to audio and/or video data to be transmitted and buffered of at least two program titles not yet reproduced.

10. A media reproduction system for audio and/or video data for a vehicle which is connected to a data receiver as claimed in claim 9.

* * * * *